UNITED STATES PATENT OFFICE.

ALFRED J. JARMAN, OF NEWARK, NEW JERSEY, ASSIGNOR OF ONE-HALF TO JAMES J. TRAVERS, OF NEW YORK, N. Y.

PROCESS FOR MOLDING PLATES.

1,097,440. Specification of Letters Patent. Patented May 19, 1914.

No Drawing. Application filed March 14, 1913. Serial No. 754,215.

*To all whom it may concern:*

Be it known that I, ALFRED J. JARMAN, a subject of the King of Great Britain, and a resident of Newark, in the county of Essex and State of New Jersey, have invented new and useful Improvements in Processes for Molding Plates, of which the following is a full, clear, and exact description.

The object of the invention is to produce an inexpensive, light and reliable molding plate for half-tone or line work in typographic or intaglio printing, which plate will receive all the impressions of a suitable matrix, no matter how fine, which will not warp, and will give a good hold to the printing ink.

The above objects are obtained by providing a plate formed of a composition of celluloid or nitro-cellulose with all or one of the following metals: aluminum, magnesium, and zinc. The metals, aluminum, magnesium and zinc, are diffused into the body of the celluloid, forming, figuratively, a spongy skeleton, the cells of which are filled with the celluloid. The amount of metal in the plate so formed, in relation to the celluloid, may vary from six to seventeen per cent., according to the size of the plate and the class of work it is intended for. The plates when formed will have one face impressed with a suitable matrix and the opposite face treated with an inorganic acid, preferably hydrochloric. The acid will eliminate from this face the exposed metal, and form an etched surface which will give a good hold to a cement by means of which the plate may be fastened to a suitable block. The cement I prefer to use is gutta percha in one of the following compounds: chloroform, benzol, or carbon di-sulfid. This is applied by means of a brush to the face treated by the acid. Before the plates can be impressed by the matrix the face must be softened. Preferably two blocks are connected to each other before being treated with acid, so that the two faces can be exposed to vapors of amyl or ethyl acetate, which will soften the exposed surface sufficiently deep to make the impression on this surface by the matrix, leaving the remaining, major part of each plate hard. The fine veins of metal disposed on the face of the plate will be easily depressed by the matrix and these depressed veins of metal form a tooth or hold for the printing ink on this surface. The softening of the surfaces for impressions can also be made by exposing them to heat, if desired. The metal diffused in the celluloid as above described, forming a spongy skeleton constitutes a frame which prevents warping of the plate when the impressed surface is hardened. The plates formed and impressed as above described, may be of any desired shape according to the style of printing used. The plates will be light in weight, as the amount of metal used is light, and the metals themselves are of light specific gravity.

The process of preparing the plate is as follows: The celluloid and the powdered metal are well stirred so that the metal will be properly diffused in the mass of the celluloid. The mass is then left to solidify, and when solidified is cut into plates of proper size and shape. Every pair of plates is put back to back, the opposite faces being exposed to the vapors of amyl or ethyl acetate until sufficiently softened. The plates are then taken apart and each of the softened surfaces impressed by a suitable matrix. When the impressed surface of the plates is hardened, the opposite surface is treated with hydrochloric acid, dried, and then, finally, the gutta percha, in a solution as above described, is brushed on the face treated with the acid.

The advantage of the plates formed by means of my process is that by means of a suitable matrix a plurality of plates may be formed in a place and then sent to the desired places where they can be utilized for printing purposes. The plates being light in weight can be cheaply sent to any desired place, and where, when received, the plates can be mounted on a suitable wooden block, by applying gutta percha to the surface of the wooden block to which the plate is to be attached. It can be easily seen that the gutta percha stored in the plate will co-act with the gutta percha coated on the block and form a perfect binding.

Having thus described my invention, I claim as new and desire to secure by Letters Patent:—

1. The process for molding plates, consisting of forming plates of a composition of celluloid and metal, connecting a pair of plates together, exposing the so-connected plates to vapors of amyl acetate to soften the exposed surfaces only, separating the plates, then impressing each of the softened faces with a suitable matrix, treating the opposite face of each plate with a non-organic acid, and coating said treated surface with a cement, then mounting said plates, with the cement-coated surface on a wooden block, by means of said cement.

2. The process for molding plates, consisting of forming plates of a composition of celluloid and metal, connecting a pair of plates together, exposing the so-connected plates to vapors of amyl acetate to soften the exposed surfaces only, separating said plates, then impressing each of said softened faces of said plates with a suitable matrix, treating the non-impressed faces of the plates with hydrochloric acid, coating said acid-treated surface with cement, and mounting said plates with the cement-coated surfaces on a wooden block by means of said cement.

3. The process for molding plates, consisting of forming plates by a composition of celluloid and aluminum, connecting each pair of plates together, exposing the so-connected plates to vapors of amyl acetate to soften the exposed face only, separating each pair of connected plates, and impressing each of said softened surfaces of said plates with a suitable matrix, treating the non-impressed face of each of the plates with hydrochloric acid, then coating the said acid-treated surface with a cement dissolved in an easily volatile substance, and mounting the same on a suitable block by means of the coat of cement.

4. The process for molding plates, which consists of forming plates by a composition of celluloid and aluminum, connecting each pair of plates together, exposing the so-connected plates to vapors of amyl acetate to soften the exposed faces only, separating each pair of plates, then impressing said softened surface of each plate with a suitable matrix, treating the non-impressed face of the plates with hydrochloric acid, and coating the so-treated face with gutta percha dissolved in a highly volatile solution, and mounting said plates on suitable blocks with the said faces coated with gutta percha.

5. The process for molding plates, which consists of forming plates by a composition of celluloid and aluminum, connecting each pair of plates together, exposing the connected plates to vapors of amyl acetate to soften the exposed faces only, separating each pair of plates, then impressing said softened surface of each plate by a suitable matrix, treating the non-impressed face of the plates with hydrochloric acid, then coating the acid-treated face with gutta percha dissolved in benzol, and mounting said plates on suitable wooden blocks with the faces coated with gutta percha attached to the block.

6. The process for molding plates, which consists of forming plates of a composition of celluloid, aluminum, magnesium and zinc, connecting every pair of plates together, exposing the so-connected plates to vapors of amyl acetate to soften the exposed faces only, separating every pair of plates, then impressing the softened face of each of said plates with a suitable matrix, treating the non-impressed face of the plates with hydrochloric acid, then coating the said treated face with gutta percha dissolved in benzol, and mounting said plates with their coated faces on a suitable wooden block.

7. The process for molding plates, which consists of forming plates of a compound of celluloid, aluminum, magnesium and zinc, the amount of metal in the celluloid varying from six to seventeen per cent., connecting every pair of plates together, exposing the so-connected plates to vapors of amyl acetate to soften the exposed faces only, separating the plates, then impressing said softened face of each plate with a suitable matrix, then treating the non-impressed face of the plates with diluted hydrochloric acid, coating the said treated face of each plate with gutta percha dissolved in benzol, and mounting said plates with their coated faces on suitable wooden blocks.

8. The process for molding plates, which consists of forming plates of a composition of celluloid and a metal, the metal being diffused in the celluloid, forming a spongy skeleton, the cells of which are filled by the celluloid, connecting each pair of plates together, exposing the connected plates to vapors of amyl acetate to soften the exposed faces only, separating the plates, then impressing the softened face of each plate with a suitable matrix, treating the non-impressed face of each plate with hydrochloric acid, and coating each of the said treated faces with cement, and mounting each plate with the coated surface on a suitable block.

In witness whereof I have signed my name to this specification in the presence of two subscribing witnesses.

ALFRED J. JARMAN.

Witnesses:
 JAMES J. TRAVERS,
 BENEDICT JOFFE.